United States Patent

[11] 3,568,566

| [72] | Inventor | Miles Weidig |
| | | Kenwood, Ohio |
| [21] | Appl. No. | 752,050 |
| [22] | Filed | Aug. 12, 1968 |
| [45] | Patented | Mar. 9, 1971 |
| [73] | Assignee | The Carlton Machine Tool Company |
| | | Cincinnati, Ohio |

[54] TOOL SPINDLE MECHANISM
2 Claims, 7 Drawing Figs.

| [52] | U.S. Cl. | 90/11, 77/3 |
| [51] | Int. Cl. | B23c 1/00 |
| [50] | Field of Search | 90/11.1; 77/3; 279/49, 51, 55 |

[56] References Cited
UNITED STATES PATENTS

| 1,807,265 | 5/1931 | Walker | 90/11-1X |
| 2,860,547 | 11/1958 | Stephan | 90/11-1 |
| 3,177,775 | 4/1965 | Alisauskis | 90/11-1 |
| 3,333,511 | 8/1967 | Schoepe | 90/11-1 |
| 3,442,175 | 5/1969 | Heap et al. | 90/11(.1) |

*Primary Examiner*—Gil Weidenfeld
*Attorney*—Edward J. Utz

ABSTRACT: An axially adjustable tool-locking mechanism for automatic machine tools utilizing a draw tube with a locking bar and an ejector collar and a plurality of locking fingers for moving said tool holder into locking or released position.

Patented March 9, 1971 3,568,566

INVENTOR.
MILES WEIDIG
BY
Edward J. Utz
ATTORNEY.

INVENTOR.
MILES WEIDIG
ATTORNEY.

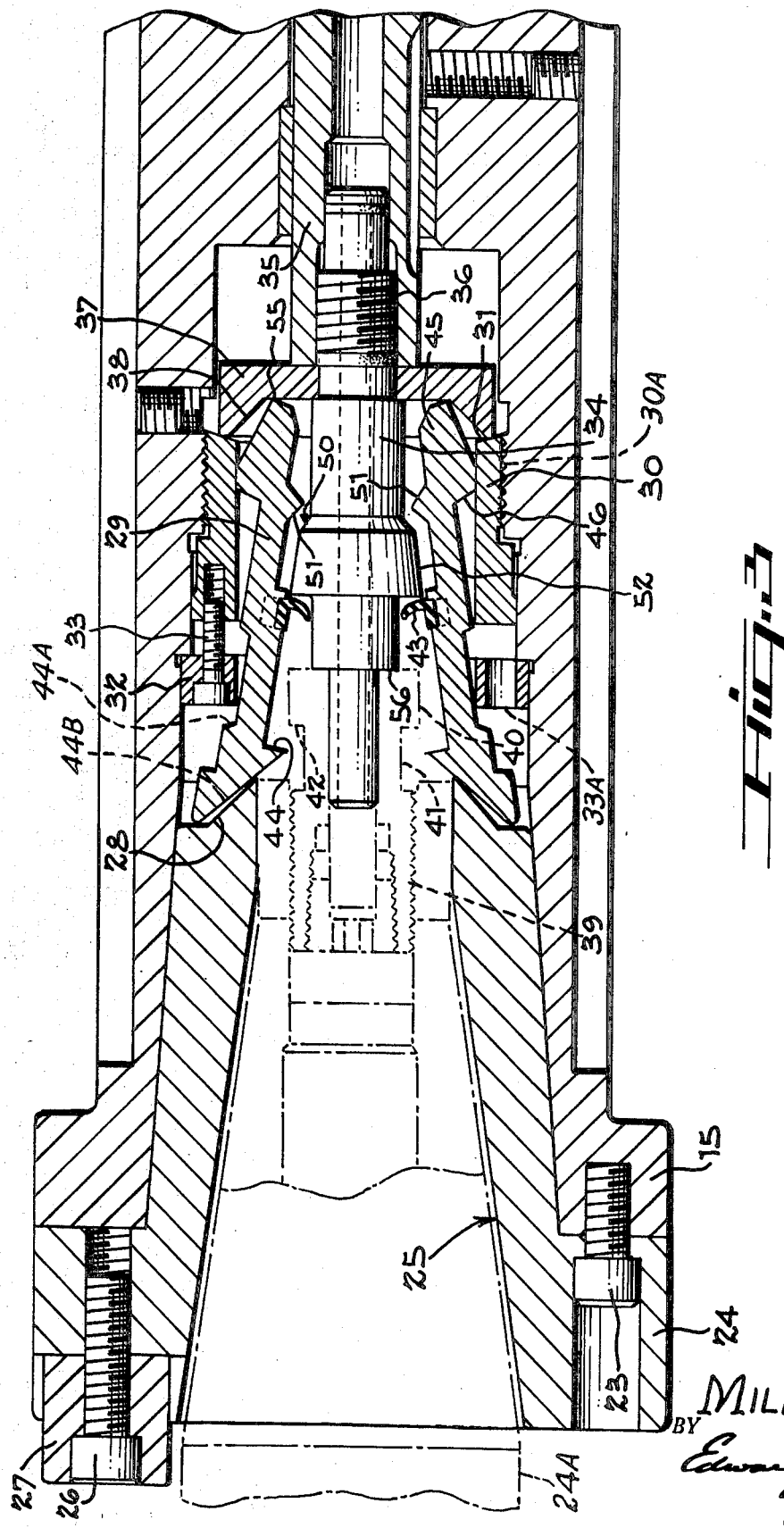

Patented March 9, 1971
3,568,566
5 Sheets-Sheet 4
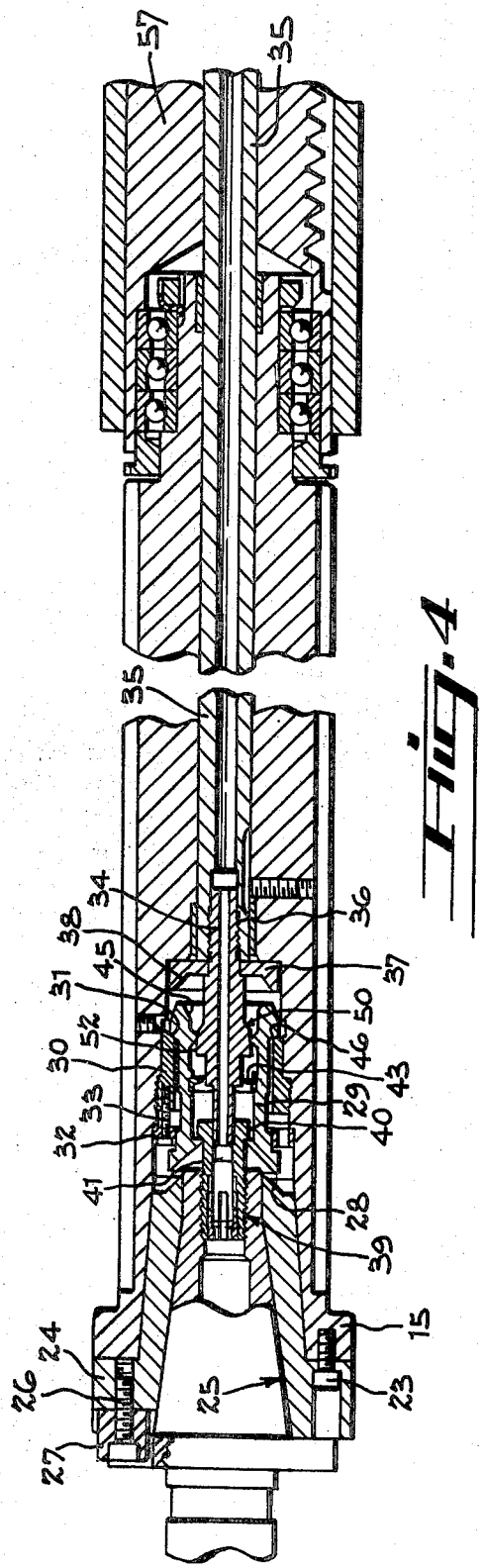
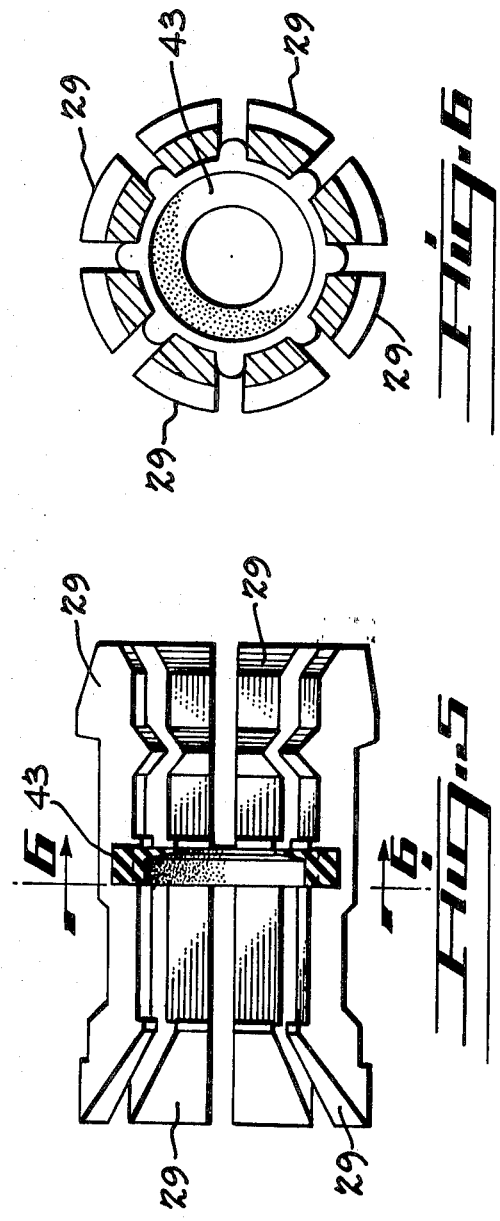
INVENTOR.
MILES WEIDIG
BY
ATTORNEY.

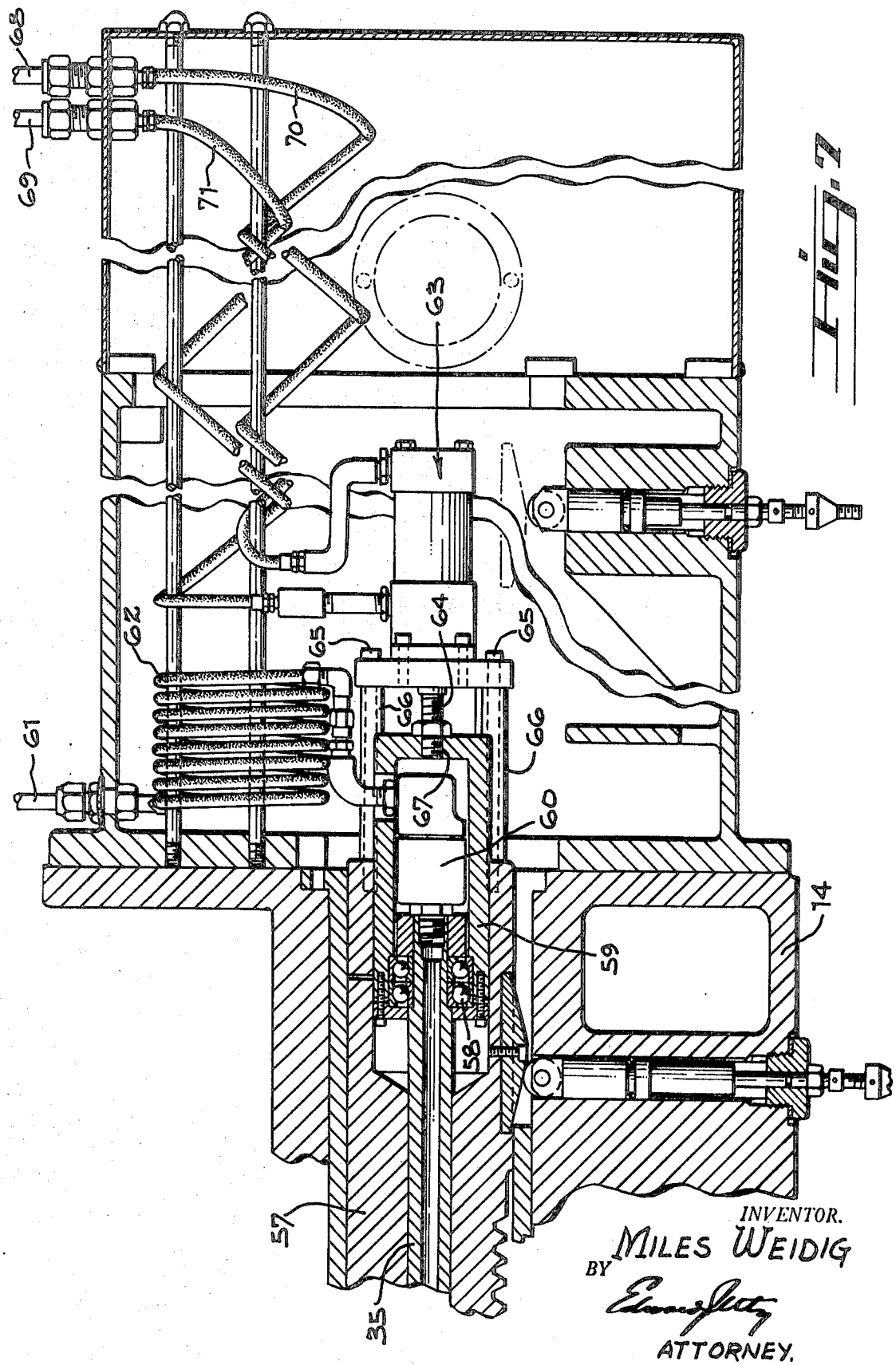

TOOL SPINDLE MECHANISM

My invention relates to machine tools, especially horizontal boring and drilling and milling machines, but more particularly to the tool spindle mechanism.

The principal object of my invention is the provision of a new and improved tool-securing means for use with a horizontal boring, drilling and milling machine. The tool-securing means is mounted within the spindle.

My invention discloses essentially a power tool lock for securing or locking a tool with the spindle of either an automatic machine, or a manually operated machine.

Another object of my invention is a provision of a machine tool lock having a collet which grips a tool holder and draws it into a tapered spindle nose provided on the machine's spindle.

Another object of my invention is the provision of means in the collet-type mechanism within the spindle for releasing the tool holder in the spindle socket.

Still another object of my invention is the provision of a collet-type tool lock which is so designed that it transmits sufficient force to prevent the tool holder and thus the tool from becoming disengaged from the spindle mechanism.

Another object of my invention is the provision of a tool lock for securing the tool in the tapered spindle nose to secure the maximum advantages from the design of a tapered nose, which are rigidity and accuracy.

Another object of my invention is the provision of a tool lock which so secures the tool to the spindle nose that chatter is virtually eliminated.

Still another object of my invention is the provision of a tool lock which, in addition to securing the tool in the tapered spindle nose, floats within the mechanism so the radial alignment of the tool with the spindle nose is maintained despite the forces exerted by any misalignment of the tool lock device.

Another object of my invention is the provision of a tool lock device for a machine tool which has a hydraulically controlled rod for ejecting the tool from the spindle.

Another object of my invention is the provision of a tool lock for use with machine tools whereby the tool lock is initially actuated in response to applied hydraulic pressure. After the tool is initially locked, a mechanical locking feature of my invention, and one of the objects of my invention, secures the tool in position without further reference to the hydraulic forces.

Another object of my invention is the provision of a tool lock which permits the use of coolant through the center of a tool.

A still further object of my invention is the provision of a machine tool device which permits the tool lock to be utilized, causing the tool to be locked in the spindle and later to be ejected from the spindle, without the attention of the operator.

Another object of my invention is the provision of a collet-type machine tool lock for locking a tool to a spindle which has members which are not flexed during the locking operation or at any time during the ejection operation, as opposed to the flexing which occurs in a conventional collet.

Another object of my invention is to provide a tool lock which has elements which are moved about the locking surface in response to the movement of a rod connected within the spindle to a suitable driving means for reciprocation.

Another object of my invention is to provide a tool lock having elements which pivot either into or out of locking engagement.

Another object of my invention is that I provide a tool lock which may be adapted through an axially adjusting adapting device to a standard tool holder.

In general, my invention comprises a tool lock which is particularly adapted for use with automatic machine tools and, more especially, for use with automatic tool changer mechanisms such as may be employed in a horizontal boring, drilling and milling machine of the type having a bed upon which a saddle is movable and having a column on the said saddle with a saddle and head connected to said column and adapted to be raised or lowered to various positions. This device which I have shown in this application for patent is not confined, however, to automatic machines such as a horizontal drilling, boring and milling machine common to the art, but may be employed with other types of machinery such as radial drills of the conventional type, well known in the art, along with various other types of metal cutting machines employing various types of tools and where it is necessary to secure rigidity between the spindle member and the tool itself.

In my invention I employ this tool lock for use with a tool holder to secure the tool to the spindle of the machine. My tool lock consists essentially of a draw tube with a locking bar threadedly secured to the draw tube. An ejection collar is mounted between the locking bar and the draw tube. Surrounding the locking bar is a collet-type member consisting of a plurality of bars or locking fingers which are held in general alignment by means of a neoprene spider. I employ a clamping sleeve to operate in connection with the fingers which has various cam surfaces. The sleeve is so made and constructed that it is adjustable. I provide a plurality of openings in a rotating collar which openings receive a tool to rotate the collar which rotates an adjusting sleeve threaded within the spindle to permit all tools regardless of machine style to have length of the adapter adjusted with respect to the taper to be the same. The draw tube and the clamping bar are so made and constructed that coolant may be passed through said device into the tool holder and through the tool, with appropriate sealing devices. The spindle nose adapter used in conjunction with my tool lock has a cam surface which serves to expand the fingers to release the tool.

In my invention, which is illustrated in the accompanying drawings, I show in:

FIG. 1 a machine of the horizontal boring, drilling and milling type on which I utilize the tool lock which I will describe in detail.

FIG. 3 is a detailed sectional view of the spindle nose and the spindle lock mechanism in it its unclamped position.

FIG. 4 shows the entire spindle with the tool lock in its clamped position.

FIG. 5 shows the collet assembly of my invention.

FIG. 6 is the detailed sectional view taken along the lines 6–6 of FIG. 5.

FIG. 7 shows the hydraulic mechanism for use with the draw tube of my invention.

Figure 1:
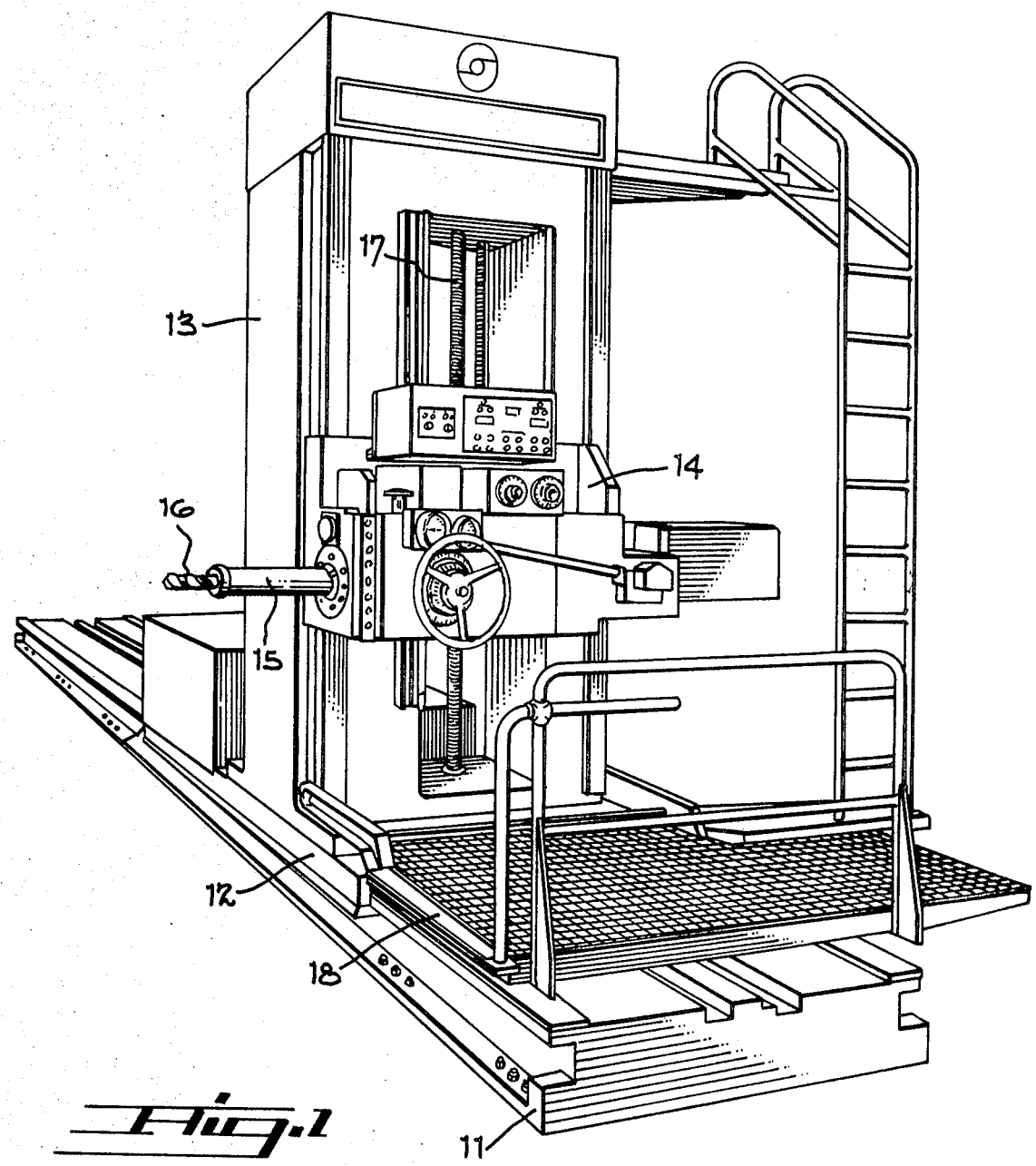

In FIG. 1 I show a horizontal boring and drilling and milling machine of the type for which my tool lock is particularly adapted, which comprises a bed plate 11 having a saddle member 12 to which is affixed a column 13 for carrying another saddle member 14 which contains the spindle mechanism along with the tool lock. The saddle member 14 contains the spindle 15 adapted to carry a tool such as 16 in its end. The saddle member 14 may be raised or lowered by means of a screw 17. I also show an operator's platform 18 which is mounted on the column so that it will ride with and follow the position of the head and saddle mechanism 14.

Figure 2:
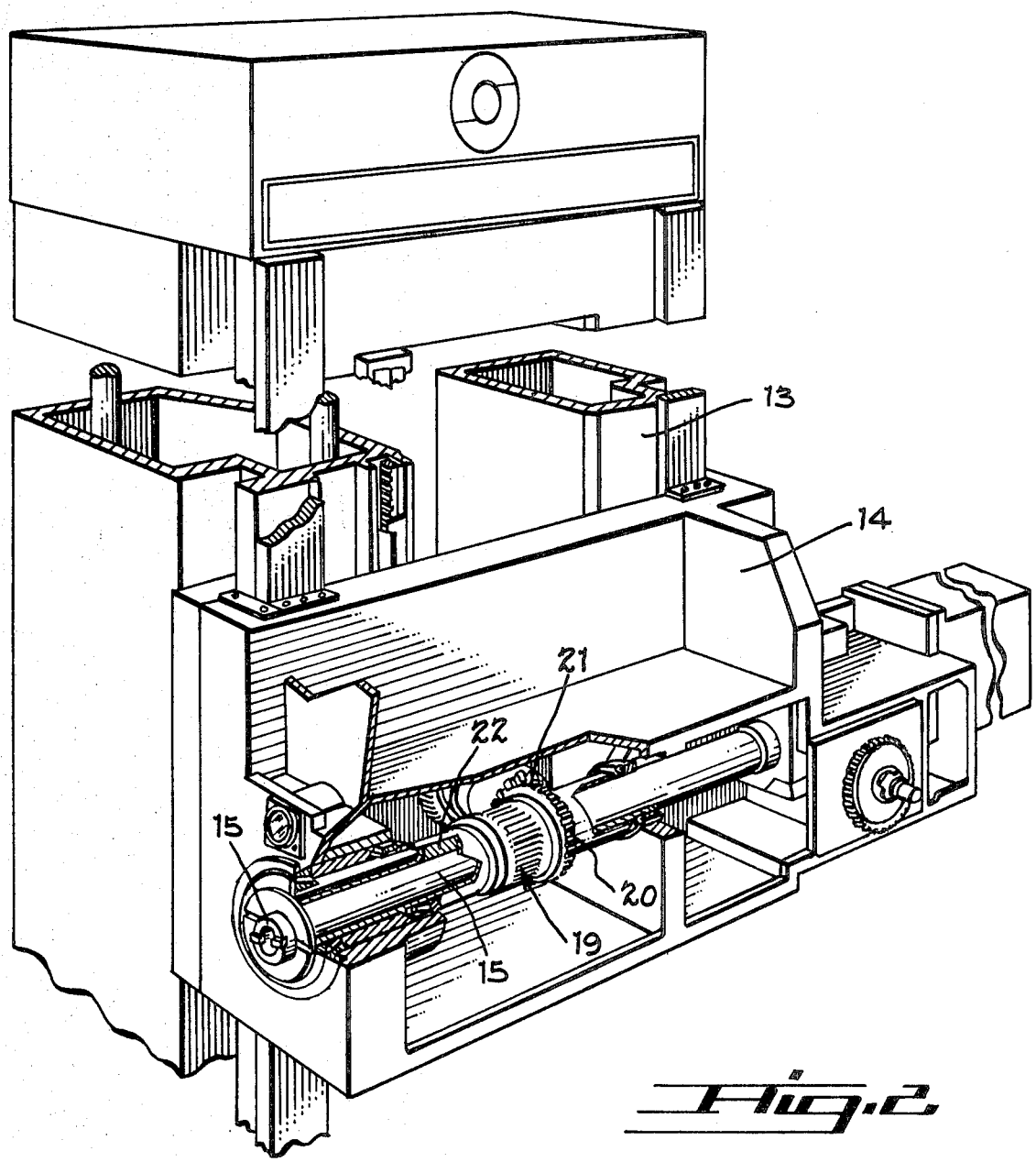
FIG. 2 shows the head of the machine illustrated in FIG. 1 and has a portion thereof removed to illustrate the general spindle assembly.

In FIG. 2 I show a partial sectional view of the column 13 showing the head and saddle member 14 partially broken away. The spindle mechanism indicated generally by the numeral 19 comprises a spindle 15, with suitable means for driving the spindle, for example, bevel gear 20, which is adapted to mesh with a bevel gear 21, driven by some suitable power source. I also provide a spindle sleeve 22 which is directly driven by the gearing previously described. The spindle is mounted within the sleeve 22, permitting the spindle to be rotatably driven by means of keys (not shown) while allowing the spindle to move in and out of the sleeve independent of rotation. Specifically, my invention as illustrated particularly in FIGS. 3 and 4, which show a spindle 15 to which is secured by means of screws 23 a spindle nose adapter 24. The spindle nose adapter has within its configuration a standard tapered seat with the taper indicated generally at 25, which also contains the standard driving key 27 secured by a screw such as 26. I provide on the adapter a special cam surface illustrated at 28 which is adapted to expand fingers such as finger 29. Within the spindle I have threadedly secured a locking sleeve 30 which has a cammed edge 31. Secured to the locking sleeve 30 is a locking collar 32 secured by means of screws such as 33. The sleeve 30 is axially adjusted through loose screw 33 by inserting a spanner wrench into hole 33A in the collar 32 and rotation of collar 32 causes sleeve 30 to rotate by means of screws such as 33, since sleeve 30 is threaded at 30A in spindle 15 which produces axial adjustment of the clamping sleeve. The adjustment is secured by tightening screws 33. Within the group of fingers 29 a locking or clamping bar 34 is threadedly secured to the end of a draw tube 35 by means of threads provided at 36 on the bar and on the tube. The locking tube 35 has secured at its end adjacent to the locking or clamping bar an ejector collar 37. The ejection collar 37 is provided with a cam surface 38 to cooperate with fingers 29. The fingers such as finger 29 are tied together with a contour molded neoprene bonding element 43 and are permitted to float within the spindle mechanism in response to the contour of certain cams in the spindle and on the sleeves provided around the locking bar.

I show a draw stud 39 which is shown in phantom and is not part of this invention as such however its shape is part of the invention, which is threaded into a standard tool holder. The draw stud has a head diameter 40 with a smaller diameter 41 to provide a flat locking surface 42 for meeting the projections 44 on the fingers 29. The flat locking surfaces are used to prevent any dislocation of the locking fingers from a concentric position from having any radial influence on the draw stud, thereby allowing the tool arbor 24A to seat firmly and accurately on the taper of the adapter 24. The continued movement of the draw tube 35 and clamping bar 34 into a clamping position away from the face of the spindle causes the fingers first to engage the flat locking surface 42 of the stud 39. Further movement of the clamping bar and the draw tube causes the fingers to move away from the spindle nose to cause the tool holder to move into the spindle nose and to become firmly seated on the tapered portion of the spindle nose adapter indicated at 24. Jaws 44 are provided with cam surfaces 44A and 44B. Continued movement of the clamping bar and draw tube causes the rear end of the fingers, particularly at 45, to expand outwardly to cause cam surface 46 on the fingers to mate with cam surface 31 on the sleeve 30. This causes a locking action between the surface 44 and the surface 42 on the tool stud, producing sufficient axial force to secure the tool in its locked position and hold it against any forces which develop during the cutting. To further detail the sequence of events during the tool locking cycle, cam surface 50 on the draw bar 34, when it is first drawn back, abuts the lug 51 on a finger such as 29, which causes the fingers to move to the rear. This movement brings cam surfaces 44A on fingers 29 into contact with collar 32, collapsing the forward end of the finger assembly, and causing the jaws 44 to engage the tool holder and draw the tool into seating position. Further movement produces a contact between the cam surface 52 and the end of the lug 51, resulting in the expansion of the rear end of the finger assembly past the end of sleeve 30 at surface 31, since the fingers 29 are now in position to allow this. The final expansion applies the high holding or locking force to the tool, because of the low cam angles of surfaces 52 and 31. Since these cams are self locking, it is not necessary to maintain force on the draw tube to hold the tool in place.

When the tool is ejected, the draw bar is forced outwardly and the ejection collar 37, at surface 38, contacts the edge 55 of the fingers to cause the fingers to collapse and the reverse of the process just described causes the tool to be ejected. As the fingers expand with the further movement of the draw tube and clamping bar, the surface 56 contacts the tool holder to eject the tool.

In FIG. 7 I show the draw tube 35 at its upper end which rotates with the spindle 15. The draw tube 35 rotates within the rack or feeding sleeve 57 which is nonrotatable. I provide at the end of the draw tube 35 a bearing 58 which is seated in a swivel carrier 59 which contains a standard fluid swivel 60 which is utilized when coolant is used with the tool. The coolant is supplied through a line 61 connected to a flexible line 62 to a fluid swivel 60, then through an aperture 60A in the draw tube 35, (FIG. 7) then through draw bar 34 into tool adapter 39 (FIG. 4) then through a tool. The flexing ability of the line 62 allows for the rearward movement of the assembly. The draw bar is moved axially by means of a hydraulic cylinder cylinder indicated in general at 63 which contains the usual piston, the rod of which is shown at 64. The cylinder 63 is rigidly secured to the ends of the rack sleeve 57 by studs 65 and sleeves 66. The piston rod 64 is adjustably secured to the carrier at 67. The hydraulic fluid for operating the cylinder 63 is through lines 68 and 69 through flexible tubing lines 70 and 71.

I claim:

1. In an axially adjustable tool locking mechanism, the combination of a spindle having a tapered socket, an adapter fixed to the spindle, a tool arbor to be received in said adapter, a draw stud secured to said tool arbor, a shoulder on said draw stud having a flat locking surface, an axially movable locking bar, a locking member carried on said locking bar having expansible fingers, said having flat surface portions near one end engageable with the flat locking surface of said draw stud and cam surfaces near the other end, an axially adjustable sleeve with cam surfaces threadedly secured within said spindle, said cam surfaces on said locking finers being engageable with the cam surface on said clamping sleeve, said locking member having means causing said fingers to contract upon rearward axial movement of said locking member, whereby said flat locking portion surface on said draw stud is engaged by the flat surface portions on said fingers and the cam portions on said fingers and said clamping sleeve engaged to clamp said tool holder in a locked position.

2. In an axially adjustable tool locking mechanism, the combination of a spindle, means for driving the spindle, a spindle sleeve within which said spindle is mounted, a spindle nose adapter secured to said spindle for receiving a tool holder, an axially movable locking bar, a locking member carried on said locking bar having expansible fingers, means on said fingers for locking a tool holder in said adapter, said fingers having cam surfaces at one end engageable with the cam surfaces on said adapter and cam surfaces near the other end, a locking sleeve having a cam surface, said cam surfaces near the other end of said fingers being engageable with the cam surface of said locking sleeve when said locking member is moved rearwardly by the locking bar to a locking position, a draw tube threadedly secured to said locking bar for axial movement thereof, an ejector collar secured to said locking bar having a cam surface thereon, whereby forward movement of said locking bar from the locking gpositin position will cause the cam surface of said ejector to act on said fingers to unseat them from the cam surface of said locking sleeve and allow said fingers to expand at said one end due to the engagement of the cam surfaces thereon with the cam surface on the adapter.